United States Patent [19]

Alberkrack

[11] Patent Number: 4,648,021
[45] Date of Patent: Mar. 3, 1987

[54] FREQUENCY DOUBLER CIRCUIT AND METHOD

[75] Inventor: Jade H. Alberkrack, Tempe, Ariz.

[73] Assignee: Motorola, Inc., Schaumburg, Ill.

[21] Appl. No.: 815,963

[22] Filed: Jan. 3, 1986

[51] Int. Cl.$^4$ ............................................. H02M 5/00
[52] U.S. Cl. .................................. 363/157; 307/267; 307/271; 318/345 E; 328/20
[58] Field of Search ................. 307/267, 271; 328/20, 328/158; 363/157, 164, 165; 318/345 E

[56] References Cited

U.S. PATENT DOCUMENTS

| | | | |
|---|---|---|---|
| 3,067,344 | 12/1962 | Branum et al. | 307/267 |
| 3,571,628 | 3/1971 | Braun et al. | 307/265 X |
| 3,638,045 | 1/1972 | Hughes | 307/267 |
| 3,901,247 | 8/1975 | Walmsley | 307/267 X |
| 4,001,716 | 1/1977 | Swanson et al. | 307/271 X |
| 4,501,974 | 2/1985 | Miller et al. | 307/267 X |
| 4,563,741 | 1/1986 | Matsumara | 328/20 X |

OTHER PUBLICATIONS

Horowitz et al., *The Art of Electronics,* Cambridge University Press, 1980, p. 376.

*Primary Examiner*—Patrick R. Salce
*Assistant Examiner*—Marc S. Hoff
*Attorney, Agent, or Firm*—Michael D. Bingham

[57] ABSTRACT

A frequency doubling circuit which produces a pair of pulses for each cycle of an input pulse applied thereto includes an inverter for producing a pulse that is inverted with respect to the applied input pulse. The inverted pulse is directly applied to a first input of an exclusive OR gate and a time delayed inverted pulse produced from the inverter output pulse is applied to a second input of the gate to produce the pair of pulses in response to the leading and trailing edges of the input pulse. The pair of pulses are then applied to a pulse stretching circuit which produces corresponding output pulses the pulsewidths of which are greater than the pulsewidths of the pulses applied thereto. A plurality of the frequency doubling circuits may be utilized to sequentially drive the pulse stretching circuit by OR'ing the outputs of the former to the latter. In such case a frequency doubling tachometer is realized that can be used in a closed loop DC Motor control system.

5 Claims, 3 Drawing Figures

FREQUENCY DOUBLER CIRCUIT AND METHOD

BACKGROUND OF THE INVENTION

The present invention is related to frequency multiplying and, more particularly, to a circuit and method for producing output pulses which occur at twice the rate of input pulses supplied to the circuit.

Frequency doubling circuits are well known in the art. For example, a frequency doubling tachometer circuit is known that comprises a Norton amplifier to which voltage pulses are supplied and converted to current pulses through a series connected RC network which is coupled to the non-inverting input of the amplifier. The output of the amplifier is returned to the inverting input via a parallel RC network. A diode is connected between the inverting and non-inverting inputs of the amplifier. The operation of the circuit is to average the charge and discharge transient currents that flow through the RC network. The capacitor is therefore charged and discharged in response to the leading and trailing edges of the input pulses to produce two current output pulses for each cycle of the input frequency.

The above described frequency doubler circuit has several problems associated therewith that limits its application in systems that require multiple frequency doubling. For instance, control of three phase DC brushless motors wherein a tachometer function is required for each of the three motor phases. A first problem related to the prior art frequency doubling circuit arises due to the fact that the charge and discharge paths for producing the output current pulses are different. This results in the frequency doubling circuit being edge sensitive, i.e., the pulse widths of the two output current pulses will be different which may be highly undesirable in motor control systems. In addition, if multiple frequency doubling circuits are required, all of the individual components of each circuit associated with the motor phases must be matched to one another which is difficult and expensive.

Hence, a need exists for an improved frequency doubling circuit that is suited to be fabricated in integrated circuit form and which is responsive to a plurality of input pulses supplied thereto in phase relationship to one another for producing output pulses at twice the rate that the input pulses occur.

SUMMARY OF THE INVENTION

Accordingly, it is an object of the present invention to provide an improved frequency doubling circuit and method.

It is another object of the present invention to provide a frequency doubling tachometer.

Still another object of the invention is to provide a three input frequency doubling tachometer.

A still further object of the present invention is to provide a three input frequency doubling tachometer for use in a closed loop motor control system.

In accordance with the above and other objects there is provided a frequency doubling circuit that receives voltage pulses and produces output pulses at twice the frequency of the applied voltage pulses comprising a first inverter circuit coupled to the input of the circuit which inverts each of the voltage pulses applied thereto, gating circuitry coupled to the output of the inverter circuit for introducing propagation delay such that the pulses appear at the output thereof delayed in time with respect to pulses produced at the output of the inverter circuit, and logic circuitry responsive to both the pulses appearing at the output of the inverter circuit and the delayed pulses from the gating circuitry for producing first and second output pulses for each cycle of the applied voltage pulses.

DETAILED DESCRIPTION OF THE PREFERRED EMBODIMENT

Figures 1, 2:
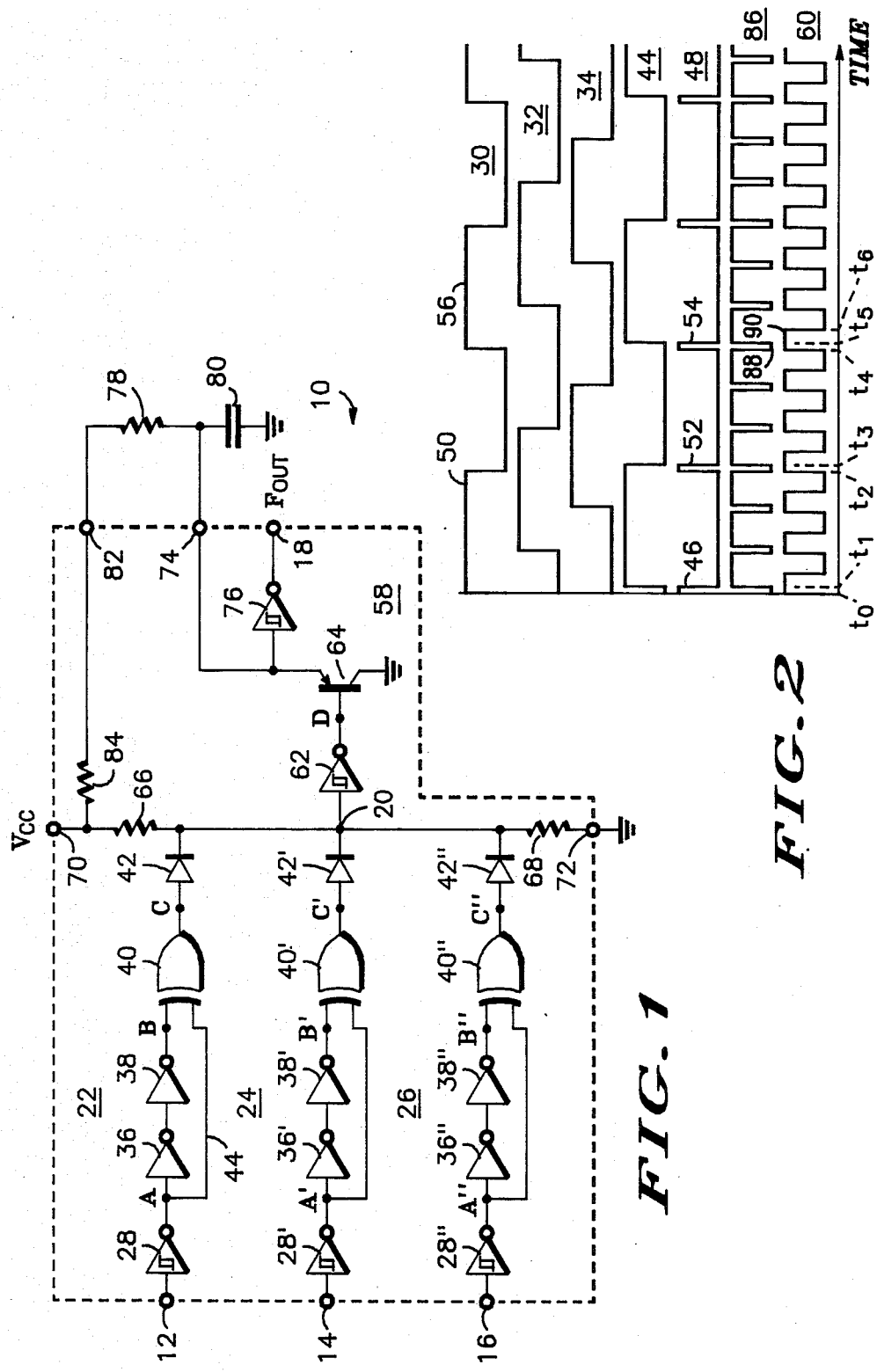
FIG. 1 is a schematic diagram of the frequency doubling circuit of the preferred embodiment.
FIG. 2 are waveforms usefull for understanding the operation of the circuit of FIG. 1.

Referring to FIGS. 1 and 2 frequency doubling circuit 10 is now discribed. Frequency doubling circuit 10 is illustrated as having three inputs 12, 14 and 16 to which are supplied voltage pulses having predetermined phase relationship to each other. As will be more fully expalined, in response to each pulse applied to a respective input a pair of output pulses are produced at $F_{out}$ terminal 18. It is understood that frequency doubling circuit 10 is suited to be fabricated in integrated circuit form. Further, it is recognized that although frequency doubling circuit 10 is illustrated as having three inputs any number of inputs may be realized in manner to be herein discribed.

Frequency doubling circuit 10 includes summing node 20 to which the outputs of three identical pulse doubling circuits 22, 24 and 26 are coupled. The inputs of the pulse doubling circuits are respectively coupled to the inputs 12, 14 and 16 of frequency doubling circuit 10. Since each pulse doubling circuit is identical to the other only circuit 22 will be discribed. It is understood that those elements of pulse doubling circuits 24 and 26 corresponding to like components of circuit 22 are designated with primed reference numerals. Thus, pulse doubling circuit includes an inverter 28, 28' and 28" coupled to a respective input 12, 14 and 16 to receive voltage pulses. Each of the inverters 28, 28' and 28", which have hysteresis associated therewith, inverts the voltage pulses appearing at nodes A, A' and A" with respect to the voltage pulses applied to the respective inputs (see waveforms 30, 32 and 34). Serially connected inverter pairs 36, 38, 36', 38' and 36", 38" are coupled between the output of respective inverters 28, 28' and 28" and one input of an associated exclusive OR logic gate 40, 40' and 40". The other input of each exclusive OR gate 40, 40', and 40" is directly connected to the output of respective inverter 28, 28' and 28". It is understood that inverters 36, 36', 36" and 38, 38', 38" may be identical to inverter 28. The output of each pulse doubling circuit 22, 24 and 26 is OR'ed at node 20 through a respective diode 42, 42' and 42".

The operation of pulse doubling circuit 22 will now be described. It is understood that pulse doubling circuits 24 and 26 function in the same manner as pulse doubling circuit 22. Thus, the voltage pulses applied to input 12 are inverted as they are passed through inverter 28 and are applied to node A, waveform 30. The voltage pulses are directly applied to one input of exclusive OR gate 40 via lead 44. Simultaneously, the pulses appearing at node A are passed through inverters 36 and 38 which introduce a predetermined propagation delay thereto such that the pulses are supplied at node B to the second input of exclusive OR gate 40 a predetermined time, $t_1$, after the pulses are applied to the first input of OR gate 40. This is illustrated by the pulses of waveform 44. The time delay may, for instance, be approximately 200 nanoseconds. Since the two logic inputs to exclusive OR gate 40 are at different logic states between time $t_0$ and $t_1$ the output of gate 40 will be in a high logic state corresponding to a logic one. Hence, a pulse 46 is produced at node C (waveform 48) of approximately 200 nanoseconds duration. Thereafter, because the two logic inputs to gate 40 are again alike, the output of exclusive OR gate 40 goes low between time $t_1$ and $t_2$. However, in response to the trailing edge of pulse 50, waveform 30, occuring at time $t_2$, the two inputs to gate 40 once again are at different logic states which causes a second pulse 52 to be produced at the output of gate 40 at node C. At time $t_3$ the output state of gate 40 is switched in response to the two logic inputs thereto assuming the same logic states. At time $t_4$ another pulse 54 is then produced at node C in response to the next input voltage pulse supplied to input 12 producing pulse 56 at node A. Hence, for each leading and trailing edge of a voltage input pulse applied to a respective input of frequency doubling circuit 10 two output pulses are produced at node 20.

Pulse stretching circuit 58 is provided to increase the width of the pulses appearing at node 20 from the outputs of the respective frequency doubling circuits 22, 24 and 26. In the present embodiment the 200 nanosecond pulses are strecthed to approximately one millisecond in duration as illustrated in waveform 60 of FIG. 2. It is recognized that the approximate duration of the pulses is given by way of example only and is not intended to limit the present invention. Pulse stretching circuit 58 includes inverter 62 coupled between node 20 and the base of PNP transistor 64. A resistive divider comprising series connnected resistors 66 and 68 is connected between a first power supply conductor 70 and a second power supply conductor 72 to set the input bias potential to inverter 62 at node 20. The emitter-collector conduction path of transistor 64 is coupled between external terminal 74 and power supply conductor 72 to which ground potential is supplied. Inverter 76 is coupled between the emitter of transistor 64 and output terminal 18. Resistor 78 and capacitor 80 are series connected between terminal 82 of frequency doubling circuit 10 and ground potential with the interconnection therebetween coupled to terminal 74. Resistor 84 is connected in series between power supply conductor 70 and terminal 82 to provide a current charge path from power supply $V_{cc}$ to capacitor 80. The pulses appearing at node 20 are inverted by inverter 62 and applied to transistor 64, waveform 86. In response to each negative going pulse, transistor 64 is rendered conductive which discharges capacitor 80. Simultaneously, the emitter of transistor 64 approaches nearly ground potential which in turn causes the output of inverter 76 to go to a high level state. For example, at time $t_4$, pulse 54 (produced at node 20) is inverted to produce negative going pulse 88 at node D. Transistor 64 is then rendered conductive as discribed above to produce positive going voltage output pulse 90 at ouput 18. At time $t_5$ the voltage at the base of transistor 64 rises as the output of inverter 62 goes to a high level state. Transistor 64 is thus turned off and capacitor 80 begins charging. The output of inverter 76, which is shown as having hysteresis, will remain in a high state until the voltage across capacitor 80 exceeds the threshold voltage thereof. inverter 76. Once the threshold voltage of inverter 76 is exceeded the output is switched to a low level as illustrated at time $t_6$. Inverter 76 has hysteresis associated therewith such that once the switching threshold has been exceeded by the voltage developed across charging capacitor 80 the threshold is decreased to prevent transient noise from causing the ouput of the inverter to be switched from one state to another as is understood.

Figure 3:
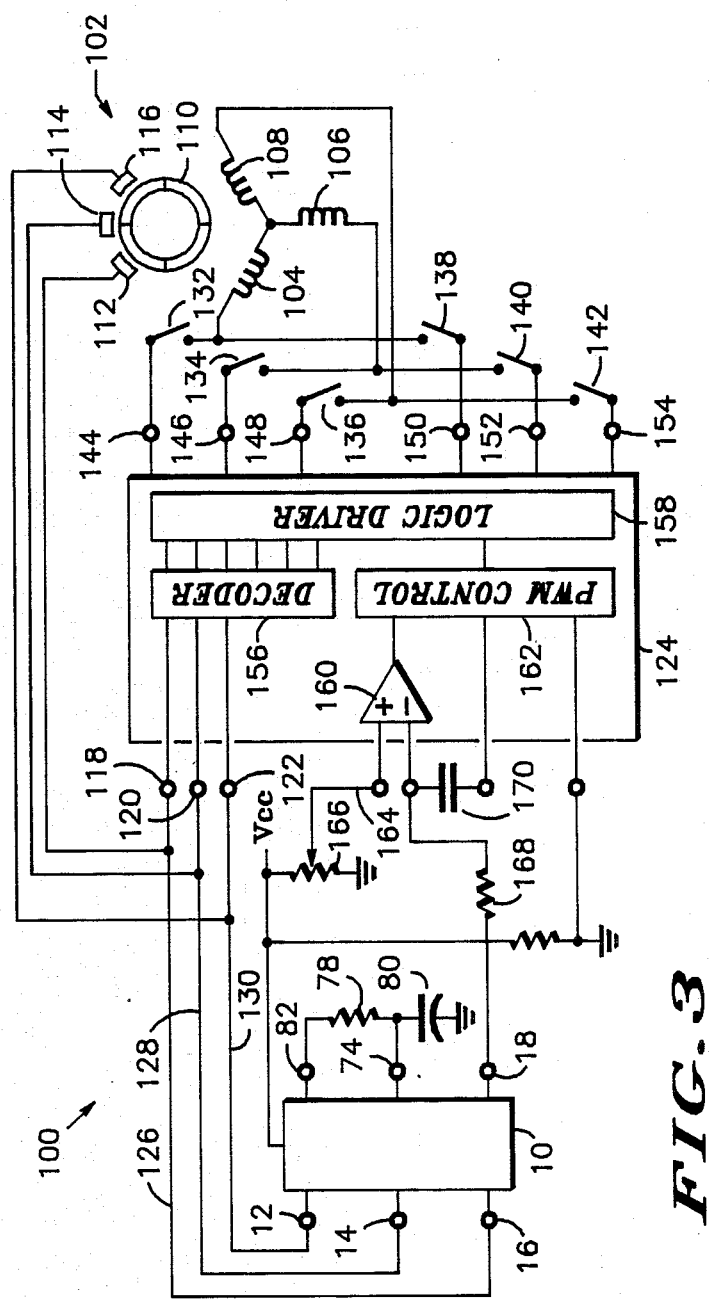
FIG. 3 is a partial block and schematic diagram of a closed loop DC brushless motor control system using the frequency doubling circuit of FIG. 1.

Turning now to FIG. 3 there is illustrated closed loop system 100 including frequency doubling circuit 10 of the present invention for controlling the drive to motor 102. Motor 102 is a three phase DC brushless motor that is familiar to those skilled in the art. Motor 102 consists of three Y-connected stator windings 102, 106 and 108, shown schematically, that surround rotor 110. Three Hall effect devices 112, 114 and 116 detect and provide positional information of rotor 110 in the form of phased related voltage pulses to the three inputs 118, 120 and 122 of integrated controller circuit 124. The positional information corresponds to waveforms 30, 32 and 34 of FIG. 2. The positional information is also supplied to the three inputs of frequency doubling circuit 10 via leads 126, 128 and 130.

Controller circuit 124 provides the speed and drive control to motor 102 by providing the proper commutation sequence to the six control switches 132, 134, 136, 138, 140 and 142 that are coupled to outputs 144, 146, 148, 150,152 and 154 of circuit 124. The function of controller circuit 124 is to receive the positional information supplied to the inputs 118,120 and 122 and commutate the three motor phases in proper sequence which causes motor 102 to produce unidirectional torque as it rotates in a given direction.

Controller circuit 124 is generally understood and is shown as including decoder 156 which receives the three motor phase information and supplies the logic information to logic driver circuit 158. Logic driver circuit 158 is responsive to decoder 154 for providing control of the switches 132 through 142 in the proper timing sequence to ensure rotation of rotor 110. At any one time during the operation of motor 102 one of the upper switches 132,134 or 136 is closed for sourcing current through a pair of the windings 104, 106 or 108 while the appropriate one of the lower switches 138, 140 or 142 is closed for sinking current from the pair of windings. The amount of energy applied to the proper windings of motor 102 during operation thereof and, hence, the speed of the motor is controlled by error amplifier 160 and pulse width modulator 162 as is generally understood. Thus, by controlling the DC voltage to the non-inverting input of error amplifier 160, by varying the position of wiper arm 164 of potentiometer 166, the width of the current pulses applied to the windings of motor 102 are varied to control the energy applied thereto.

As so far explained, the operation of motor 102 is provided in an open loop system. In this type of system the speed of motor 102 is set by adjusting potentiometer 166. If for some reason the line voltage or mechanical load conditions vary, the motor torque and speed will change. To maintain a constant motor speed requires continued adjustment of potentiometer 166. However, the use of frequency doubling circuit 10 as a tachometer enables closed loop operation and control of motor 102 whereby the speed of rotor 110 is kept substantially constant without the need for continued adjustment of potentiometer 166.

Closed loop control of motor 102 is performed by frequency doubling circuit 10 receiving the positional information from Hall devices 112, 114 and 116 applied at inputs 12, 14 and 16. Each of the Hall devices 112, 114 and 116 are spaced a predetermined number of electrical degrees apart in relation to one another, for example, sixty (60) degrees. Therefore the square wave pulses supplied to the three inputs of frequency doubling circuit 10 which correspond to the waveforms 30,32 and 34 in FIG. 2 appear sixty electrical degrees apart. As previously described, for every edge change of the applied input pulses, frequency doubling circuit 10 produces a narrow pulse at node 20 the width of which is stretched and is then supplied at output 18 of the circuit. Hence, for every one hundred eighty (180) degrees of mechanical rotation of rotor 110, six pulses are produced at output 18 of frequency doubling circuit 10. These pulses are then integrated by resistor 168 and capacitor 170 to produce a DC voltage to the inverting input of error amplifier 160 as well as pulse width modulator control circuit 162 of motor controller circuit 124. The RPM of motor 102, as initially set by potentiometer 168, is therefore sensed by frequency doubling circuit 10 to maintain a constant motor speed.

If, for example, the RPM of motor 102 should change due to variations in either the line voltage or mechanical load conditions or both, the spacing between the input pulses applied to frequency doubling circuit 10 changes which will also cause the spacing between the output pulses to change. Thus, the DC voltage, produced as the output pulses are integrated, is applied to controller circuit 124 will vary accordingly. The energy supplied to the Y-connected windings of motor 102 is therefore varied in the correct sense to change the speed of the motor to thereby maintain a constant RPM.

Hence, what has been described above is a novel three input frequency doubling circuit that is suited to function as a tachometer in a closed loop system for controlling the speed of a three phase DC brushless motor. The frequency doubling circuit produces a pair of output pulses for each edge change of an applied input pulse.

I claim:

1. An integrated frequency doubling circuit having an input to which is supplied an input pulse and an output comprising:
    a pulse doubling circuit responsive to the supplied input pulse for producing a pair of output pulses for each input pulse applied thereto; and
    means for increasing the pulsewidth of pulses applied thereto, said means being coupled to said pulse doubling circuit and including a transistor having a base coupled to said pulse doubling circuit, a collector coupled to a terminal at which is supplied a ground potential, and an emitter coupled to a terminal of the frequency doubling circuit to which is connected a charge storage device, said transistor being rendered conductive by each of said output pulses from said pulse doubling circuit to discharge said charge storage device and then rendered non-conductive by the termination of each of said output pulses to permit charging of said charge storage device, and circuit means responsive to said charge storage device being discharged and then charging beyond a threshold voltage level for producing output pulses corresponding to each of said output pulses from said pulse doubling circuit applied to said means for increasing the pulsewidth, said output pulse having an increased pulse width with respect to said applied output pulses from said pulse doubling circuit.

2. An integrated circuit having at least three inputs to which are applied at least three input pulses in sequence, each pulse having a predetermined phase relationship with respect to each other pulse, the circuit providing a pair of output pulses at an output for each applied pulse, comprising:
    first, second and third pulse doubling circuits each having an input coupled to a respective input of the circuit for producing a pair of pulses for each applied pulse;
    means for sequentially Or'ing said pulses from said pulse doubling circuits at a first circuit node; and
    means for increasing the pulsewidths of said pulses appearing at said first circuit node, said means for increasing the pulsewidths including a transistor having its base coupled to said first circuit node, its collector coupled to a first terminal at which is supplied ground potential and its emitter coupled to a second terminal, a capacitor coupled to said second terminal, said capacitor being discharged and then charged as said transistor is rendered conductive and then non-conductive in response to said pulses appearing at said first circuit node and inverter means coupled between said emitter and the output of the circuit for providing an output pulse for each pulse applied to said means for increasing the pulsewidths of said pulses, said pulsewidth of said output pulses being greater than that of said applied pulses.

3. A closed loop DC motor control system comprising detectors for providing a plurality of sequential phase related pulses corresponding to the rotational position of the rotor of the motor, a controller circuit responsive to said pulses for providing speed and drive control to the motor, a multiple input frequency doubling tachometer circuit which receives the sequential phase related pulses at respective inputs for providing a pair of pulses at an output corresponding to each pulse received at the respective inputs thereof, and integrator means coupled between said output of said frequency doubling tachometer circuit and an input of the controller circuit for providing a DC control voltage which is utilized by the controller circuit for maintaining a constant motor speed.

4. The control system of claim 3 wherein said frequency doubling tachometer circuit includes:
    a plurality of frequency doubling circuits each one of said frequency doubling circuits having an input coupled to a respective input of said tachometer circuit and an output coupled to a common node and comprising a gate circuit having first and second inputs for producing a pair of pulses in response to a first pulse and a second pulse, time delayed with respect to said first pulse, being applied respectively to said first and second inputs, said gate circuit having an output coupled to said common node, circuit means coupled between said input of said frequency doubling circuit and said second input said gate circuit for providing time delay therethrough and conductive circuit means coupling said first input to said input of said frequency doubling circuit; and a pulse stretching circuit coupled between said common node and said output of said frequency doubling tachometer for providing said pulses at said output of said frequency doubler tachometer having increased pulsewidths with respect to each of said pulses appearing at said common node from said output of each respective frequency doubling circuit.

5. The control system of claim 4 wherein said pulse stretching circuit includes:
a transistor having a base coupled to said common node, a collector coupled to a first terminal at which is supplied a ground reference, and an emitter coupled to a second terminal, said transistor being rendered conductive in response to each pulse occurring at said common node;

a RC network coupled to said second terminal including a capacitor which is discharged through said transistor and then charged to a voltage level when said transistor is non-conductive; and an inverter responsive to the discharge and then the charging of said capacitor for producing said increased pulsewidth pulses at said output of said frequency doubling tachometer.

* * * * *